Patented Jan. 23, 1934

1,944,622

UNITED STATES PATENT OFFICE 1,944,622

PROCESS FOR ABSORBING OLEFINES

Adrianus Johannes van Peski, Amsterdam, Netherlands, assignor, by mesne assignments, to Shell Development Company, San Francisco, Calif., a corporation of Delaware No Drawing. Application June 17, 1929, Serial No. 371,711, and in Great Britain July 9, 1928

8 Claims. (Cl. 260—98)

This invention relates to a process for absorbing ethylene and/or its homologues by means of suitable strong acids and for the manufacture of the corresponding esters, ethers, alcohols or other compounds.

It is an object of the invention to provide a process of the above mentioned nature by which the rate of absorption may be considerably increased with respect to the known processes of absorbing olefines in strong acids. Another important object of the invention is to avoid entirely or as far as is possible the formation of undesirable oily polymerization products which are frequently formed when absorbing olefines in the above mentioned manner by the well-known methods.

Further objects and advantages of the invention will appear as the description proceeds. It is well known that ethyl-alcohol, isopropyl alcohol, butyl alcohol, etc. may be obtained by combining the corresponding olefines with sulphuric acid and hydrolyzing the sulphates obtained. Besides alcohols other compounds such as esters or ethers may be prepared by first absorbing olefines in sulphuric acid and converting the reaction products in a suitable manner.

The rate of absorption of olefines by means of sulphuric acid in the well-known way is generally slow. By increasing the strength of the sulphuric acid the absorption is improved but the result is that a larger quantity of undesirable oily polymerization products is formed.

Attempts have been made to increase the rate of absorption. It has been proposed to perform the reaction in the presence of small quantities of silver salts or mercury salts which act as catalysts. Although the rate of absorption is more rapid when these salts are added, a considerable quantity of the above mentioned oily polymerization products is formed.

Attempts have also been made to improve the said reaction by adding froth-forming substances or emulsifiers and the like to the sulphuric acid or by dissolving the olefines in suitable solvents before bringing them into contact with the sulphuric acid.

Although the reaction is in this way accelerated the rate of absorption is not as rapid as is desired for carrying out the reaction on a commercial scale.

Furthermore, notwithstanding the use of the said catalysts, the considerable quantity of oily products chiefly formed by polymerization of the olefines into hydrocarbons of higher molecular weight decreases the ultimate yield of the desired alcohols, esters, ethers or whatever compounds it is intended to prepare.

According to the invention the said drawbacks are overcome by absorbing the olefines in acids or mixtures of acids in the presence of one or more metallic-cyano complexes, the nature of which is hereinafter described.

It has been found that the reaction may be considerably facilitated when performing the same in the presence of a catalyst comprising ferricyanic acid or ferrocyanic acid or cobalticyanic acid. Furthermore, cobalticobaltocyanic acid or platocyanic acid or chromiccyanic acid may be used. Also salts of these acids or compounds derived from said acids or from cobaltocyanic acid by substituting one or more atoms and/or atom groups by other atoms or organic or inorganic radicles or groups may be employed according to the invention. Again, compounds derived from the above specified acids or compounds by the addition of organic or inorganic compounds thereto may be advantageously used. Also cyanic acids having more than one metallic atom in the nucleus such as acids of the formula $H_8Fe_2(CN)_{12}$, $H_6Fe_2(CN)_{12}$ or salts or compounds derived from said acids in the manner as specified above may sometimes advantageously be used according to the invention. Such acids are formed by condensation of the complex cyanides having one nucleus.

The invention also comprises the use of a mixture of two or more of any of the compounds mentioned above. The olefines to be absorbed may be in a pure or substantially pure state or mixed with other compounds whether or not of inert character. The olefines to be treated may be obtained from any suitable source, for instance from natural gas or from gases or products which are formed when distilling or cracking petroleum or petroleum products. Also the olefines may be obtained from the products which are formed by the destructive hydrogenation of carbonaceous materials, such as coal, brown coal, tar, coal tar, petroleum and petroleum products, and other carbonaceous materials which are suitable for treatment by destructive hydrogenation.

The olefines to be treated may be separated in a more or less pure state from the above-mentioned products but it is also possible to treat the products such as are obtained, for instance, by destructive hydrogenation of carbonaceous materials or by cracking petroleum products and which contain certain amounts of olefines, without first separating the olefines therefrom. If desired the gases obtained, for instance by destructive hydrogenation, may be subjected to another operation as, for instance, cracking, to increase the quantity of olefines.

The invention relates to the treatment of all kinds of olefines including those with two or more double bonds and also the products obtained by polymerization of olefines of lower molecular weight. The absorption reaction may be performed under elevated pressure and, if desired, also under pressure below atmospheric pressure. In many cases, however, favorable results are obtained by carrying out the reaction at ordinary pressure. The temperature at which the reaction is carried out may vary within wide limits and may also be below ordinary temperature. If initial materials are employed containing two or more olefines it is possible to effect a ready separation of the different olefines by passing them through sulphuric acid of gradually increasing strength, though such separation forms no part of the present invention.

The catalysts specified above may be added together with froth forming, scum forming or emulsion forming substances. In order further to facilitate the absorption, the olefines may be dissolved in suitable solvents, such as gas oil previously treated with sulphuric acid, in order to improve the contact between the acid and the olefines.

The compounds which act as catalysts may be added to the acid in a finely divided state or dissolved or dispersed in suitable liquids. The concentration of the acid may vary within wide limits depending on the temperature, the catalyst employed and the nature of the olefines. The reaction may be further promoted by agitating the acid liquid and/or by introducing the gases through orifices of small diameter into the acid.

As suitable acids for absorbing the olefines according to this invention sulphuric acid may be used, but also other acids, such as phosphoric acid or suitable sulphonic acids may be employed. It is not always essential that the quantity of the acid should be equivalent to or more than the quantity of the olefine or olefines to be absorbed. Sometimes a smaller quantity of acid will be sufficient, for instance, if it is intended to manufacture esters directly. It should be understood that the invention is not in any way limited to the quantity of acid nor to the concentration or the nature of same, provided that the acid is adapted to absorb olefines therein.

Examples of the compounds suitable for this invention are as follows:—

I. *Compounds derived from ferricyanic acid*

(a) $Na_2(Fe(CN)_5NO)$ or sodium nitroprusside;

(b) Acetone sodium nitroprusside (the substance obtained by the reaction between sodium nitroprusside and acetone); (cf. Bitto. Lieb. Ann. 267, 372 (1892)).

(c) $Na_3(Fe(CN)_5NO_2)$ or sodium nitrite prusside; (cf. Hofmann, Lieb. Ann. 312, 9 (1900)).

(d) $Na_2Fe(CN)_5N(OH)SCN$ or sodium nitroprusside thiocyanic acid; (cf. Chemisch Zentralblatt 1927, I, 1430 (Tarugi)).

(e) β ferricyanides for instance $2K(Fe(CN)_4)$, $Fe(CN)3H_2O$ and $K_2Fe(CN)_5$ K $Fe(CN)_4$ $3H_2O$; (cf. Briggs Chemisch Zentralblatt 1921, I, 75).

(f) $Na_2(Fe(CN)_5NH_3)$ or sodium ferripentacyanicamine; (cf. W. Manchot Berichte 45, 2877 (1912)).

(g)

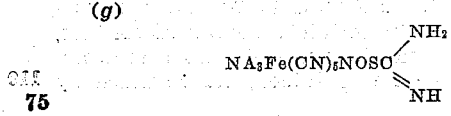

or sodium ferripentacyanic nitrosothiocarbamide; (cf. Hofmann, Lieb. Ann. 312, 31 (1900)).

(h) $C_6H_5CNH_3Fe(CN)_6$ or benzonitrilferricyanic acid. (cf. Baeyer and Villiger Berichte 34, 3617 (1901)).

Furthermore, different addition compounds from these substances with organic compounds, such as alcohols, ethers, ketones, amines, etc. may be employed.

II. *Compounds derived from ferrocyanic acid*

(a) $Na_4Fe(CN)_5NO_2$ or sodium prussonitrite; (cf. Lieb. Ann. 312, 7, 11 (1900)).

(b) $Na_3Fe(CN)_5NH_3$ or sodium ferropentacyanicamine; (cf. W. Manchot, Berichte 45, 2874 (1912)).

(c) $Na_3Fe(CN)_5CO$ or sodium ferropentacyanic carbonyl; (cf. Manchot, Berichte 45, 2870 (1912)).

(d) $Na_5Fe(CN)_5SO_39H_2O$ or sodiumprussosulphite; (cf. Lieb. Ann. 312, 4, 5, 26 (1900)).

(e) $Na_4Fe(CN)_3OAsO$ or sodiumprussoarsenite; (cf. Lieb. Ann. 312, 4 (1900)).

(f) $H_3(Fe(CN)_6)SO_3H$ sulphonic ferrocyanic acid which may be obtained by heating potassium ferrocyanide with concentrated sulphuric acid at elevated temperature, say 110° centigrade.

Also different addition compounds obtained from these and the like substances with organic compounds may be used for the purpose of this invention, for instance $C_6H_5CN.H_4Fe(CN)_6$ or benzonitrile ferrocyanic acid. Analogous compounds derived from cobalticyanic acid, cobaltocyanic acid (which itself does not exist but from which different compounds are known, for instance carbonyl cobaltocyanic acid $$(H_3Co(CN)_5CO),$$

cobalticobalto cyanic acid, $(H_3Co_3(CN)_{11})$ platocyanic acid $H_2Pt(CN)_4$ or chromiccyanic acid $H_3Cr(CN)_6$ may be employed. If the catalysts contain water of crystallization, the water may with advantage be removed therefrom, before they are used, by any suitable means.

If desired the catalyst may be recovered wholly or partly after diluting the reaction product, for example by adding a metallic salt. The recovered catalyst may be used again in the process although it should be noted that the same may not always have the same constitution as the original one.

Sometimes it is possible to prepare the catalyst in the acid, so that a preceding isolation of the substance is superfluous. This is, for instance, the case when it is intended to use sulphonic ferrocyanic acid which may be prepared as stated above, in which case the sulphuric acid may at the same time be employed as absorbing acid for the olefines.

The following examples serve to illustrate how the invention may be carried into effect:

1. Propylene is passed through 90% sulphuric acid to which 2 per cent of potassium ferricyanide has been added. The propylene is absorbed very rapidly without the formation of undesired polymerization products. The rate of absorption is considerably higher than is the case when known catalysts, for instance, mercury sulphate, are employed.

2. Propylene is passed through sulphuric acid to which a small amount of sulphonic ferrocyanic acid is added. The total amount of the propylene is absorbed.

3. Ethylene, which is generally absorbed with more difficulty, is passed at 30–35° C. through 96 per cent sulphuric acid to which a small quantity of sulphonic ferrocyanic acid is added, with the result that 35% of the ethylene is absorbed.

4. Propylene is passed into 90% sulphuric acid in which have been dissolved 5 grams of acetone sodium nitroprusside per 100 cc. of sulphuric acid. At a rate of 3.7 litres of propylene per hour per 100 cc. sulphuric acid, the absorption amounts to 91% without the formation of oily polymerization products.

5. Under the same conditions as in Example 4 but with 5 grams of ferricyanide $K_2Fe(CN)_5$, $KFe(CN)_4 3H_2O$ and at a rate of 4.1 litres per hour the absorption amounts to 90 per cent.

6. Under the same conditions as in Example 4 but with 5 grams of sodium ferropentacyanic carbonyl and at a rate of 3.7 litres per hour the absorption amounts to 97 per cent.

7. Propylene is passed through 90% sulphuric acid to which 5 grams of barium platino cyanide per 100 cc. of sulphuric acid have been added; the propylene is easily absorbed without the formation of a substantial amount of polymerization products.

8. Propylene is passed through 90% sulphuric acid to which 5 grams of tetraethylferrocyanide per 100 cc. have been added. The propylene is totally absorbed. After diluting with water and distilling, isopropyl alcohol is obtained with a yield of about 80 per cent.

9. The same experiment as described in Example 8 is carried out, but with diethylnitroprusside, whereby approximately the same results are obtained.

10. At a temperature of 100° C. ethylene is passed through 98% sulphuric acid, to which 5 grams of tetraethyl ferrocyanide have been added. After 38 litres of ethylene have been absorbed per 100 cc. sulphuric acid, no polymerization products were being formed, the mass is diluted with water and ethyl alcohol is obtained by distillation.

11. 5 grams of hexamethylferrocyanic methylsulphate are added to 100 cc. 90% sulphuric acid. Propylene is passed therethrough and absorbed, only small quantities of oily polymerization products being formed.

12. The same operation as described in Example 11 is carried out but with a catalyst obtained by alkylating potassiumcobalticyanide with diethylsulphate, the result being about the same.

13. Under the same conditions as described in Example 11 ethylene is treated, but with a catalyst consisting of potassiumcarbonylcobaltocyanide, which gives approximately the same result.

14. A gas, obtained by cracking butane and containing 30 per cent of propylene and 11 per cent ethylene is passed through an absorption liquid which is prepared in the following manner:—To 96% sulphuric acid is added 10 grams per 100 cc. sulphuric acid of potassium ferrocyanide from which the water of crystallization has been removed, whereafter the mass is heated during one hour at 110° C. Then the concentration of the sulphuric acid is reduced to 90% by adding diluted sulphuric acid whereby the concentration of the potassium ferrocyanide is decreased to approximately 5 grams per 100 cc. Into this liquid the above mentioned gas is passed whereby the propylene is entirely absorbed even when the rate of passing is very high. Thereafter the gas, which now is freed from propylene and still contains ethylene is passed through 96 per cent sulphuric acid, which also contains sulphonated ferrocyanic acid, the temperature being maintained now at 100° C. Thereby the ethylene is wholly absorbed.

15. 90 grams of $\alpha$ butylene are for several hours agitated in an autoclave with 400 grams of 70% sulphuric acid and 10 grams of potassium ferrocyanide, whereafter the mass is diluted with water and distilled. A yield of about 80 per cent of butyl alcohol is obtained.

16. At a rate of 3 litres per hour ethylene is passed at a temperature of 100° C. into a solution of 5 grams of dichlor-biphenyl-isonitrile platinum in 100 cc. 96% sulphuric acid. The ethylene is substantially totally absorbed. At a rate of 5 litres per hour the absorption still amounts to approximately 90%.

17. 50 grams of $\alpha$ butylene, 70 grams of glacial acetic acid, 10 grams of 96% sulphuric acid and 5 grams of ferrocyanic acid are heated during 8 hours in an autoclave at a temperature of 80° C. Besides a small quantity of butyl alcohol, 70% butyl acetate is obtained.

The aforesaid catalysts may also be advantageously used in the hydration of olefines by water in the presence of relatively small concentrations of acids and also for the formation of alkyl esters by the direct reaction between olefines and organic acids, for instance acetic acid, as shown in Example 17.

It should be understood that the invention relates to all processes for the manufacture of different substances which involve the step of first absorbing ethylene and/or its homologues in the appropriate strong acids and it should be understood also that since it is impossible to specify all the substances which may be used, the invention is deemed to include the use, as catalysts for promoting the absorption of ethylene and/or its homologues, of metallic cyano-compounds which are chemical equivalents of those referred to above, whatever may be their mode of production.

What I claim is:—

1. A process of absorbing unsaturated aliphatic hydrocarbons containing at least one double bond in the molecule in sulphuric acid, which consists in carrying out the absorption in the presence of complex metallic-cyano compounds.

2. A process of absorbing unsaturated aliphatic hydrocarbons containing at least one double bond in the molecule in sulphuric acid, which consists in carrying out the absorption in the presence of anhydrous complex metallic-cyano compounds.

3. A process of absorbing unsaturated aliphatic hydrocarbons containing at least one double bond in the molecule in sulphuric acid, which consists in carrying out the absorption in the presence of complex metallic-cyano compounds, and recovering said complexes from the reaction products.

4. A process of absorbing unsaturated aliphatic hydrocarbons containing at least one double bond in the molecule in sulphuric acid, which consists in carrying out the absorption in the presence of complex metallic cyano compounds, and recovering the active nucleus of said complexes from the reaction products.

5. A process of absorbing unsaturated aliphatic hydrocarbons containing at least one double bond in the molecule in sulphuric acid, which consists in carrying out the reaction in the presence of complex metallic-cyano compounds, said compounds being most finely dispersed in a liquid prior to their addition to the absorption acid.

6. A process of the absorption of unsaturated aliphatic hydrocarbons containing at least one double bond in the molecule in sulphuric acid, which consists in carrying out the absorption in the presence of complex metallic-cyano compounds, said unsaturated aliphatic hydrocarbons being contained in a gas resulting from treatment of carbonaceous materials.

7. A process of the absorption of unsaturated aliphatic hydrocarbons containing at least one double bond in the molecule, which consists in dissolving the hydrocarbons in a solvent and carrying out the absorption by treating the solution with sulphuric acid in the presence of complex metallic-cyano compounds.

8. A process of absorbing unsaturated aliphatic hydrocarbons containing at least one double bond in the molecule in sulphuric acid, which consists in carrying out the reaction in the presence of complex metallic-cyano compounds, said compounds being dissolved prior to their addition to the absorption acid.

ADRIANUS JOHANNES van PESKI.